United States Patent [19]

Schumacher et al.

[11] Patent Number: 5,204,547

[45] Date of Patent: Apr. 20, 1993

[54] AIR BAG SYSTEM FOR PROTECTION OF THE OCCUPANTS OF MOTOR VEHICLES

[75] Inventors: Hartmut Schumacher, Stuttgart; Norbert Crispin, Markgroningen; Bernhard Mattes, Sachsenheim; Edmund Jeenicke, Schwieberdingen, all of Fed. Rep. of Germany

[73] Assignee: Robert Bosch GmbH, Stuttgart, Fed. Rep. of Germany

[21] Appl. No.: 663,842

[22] PCT Filed: Sep. 14, 1988

[86] PCT No.: PCT/EP88/00837

§ 371 Date: Mar. 11, 1991

§ 102(e) Date: Mar. 11, 1991

[87] PCT Pub. No.: WO90/02674

PCT Pub. Date: Mar. 22, 1990

[51] Int. Cl.$^5$ .............................. B60R 21/16
[52] U.S. Cl. ........................ 307/10; 280/735; 340/436; 180/274
[58] Field of Search .............. 180/274; 280/734, 735, 280/736; 340/436; 307/9.1, 10.1

[56] References Cited

U.S. PATENT DOCUMENTS

| | | | |
|---|---|---|---|
| 4,220,871 | 9/1980 | Yasui et al. | 307/10.1 |
| 4,438,424 | 3/1984 | Yasui | 280/735 |
| 4,883,623 | 8/1987 | Sterler et al. | 280/735 |
| 4,933,570 | 6/1990 | Swart et al. | 280/735 |
| 5,046,149 | 9/1991 | Nuran | 280/735 |

FOREIGN PATENT DOCUMENTS

| | | |
|---|---|---|
| 0284728 | 10/1988 | European Pat. Off. |
| 2267221 | 11/1975 | France |
| WO8707388 | 2/1987 | PCT Int'l Appl. |
| WO8801241 | 7/1987 | PCT Int'l Appl. |

Primary Examiner—Jeffrey A. Gaffin
Attorney, Agent, or Firm—Kenyon & Kenyon

[57] ABSTRACT

An air bag system for protecting the occupants of a motor vehicle in the event of a collision has a plurality of firing circuits comprising air bag igniters ($3a, 3b, 3c$) in series with respective power transistors ($T_1, T_2, T_3$) which can be triggered in the event of an accident to inflate a corresponding plurality of air bags. A single energy storage capacitor (E) is connected to all of the firing circuits for supplying energy to activate the bag igniters over the upper common power stage (7) in the event that there is a loss of battery voltage when the system has been actuated. A comparator (9) monitors the voltage drops across respective resistors ($R_1, R_2, R_3$) in series with the power transistors ($T_1, T_2, T_3$) and reduces the current through these transistors in the event that an excessive current is detected. Steps are taken to ensure that the period of activation of the current supply to the igniters is limited.

10 Claims, 1 Drawing Sheet

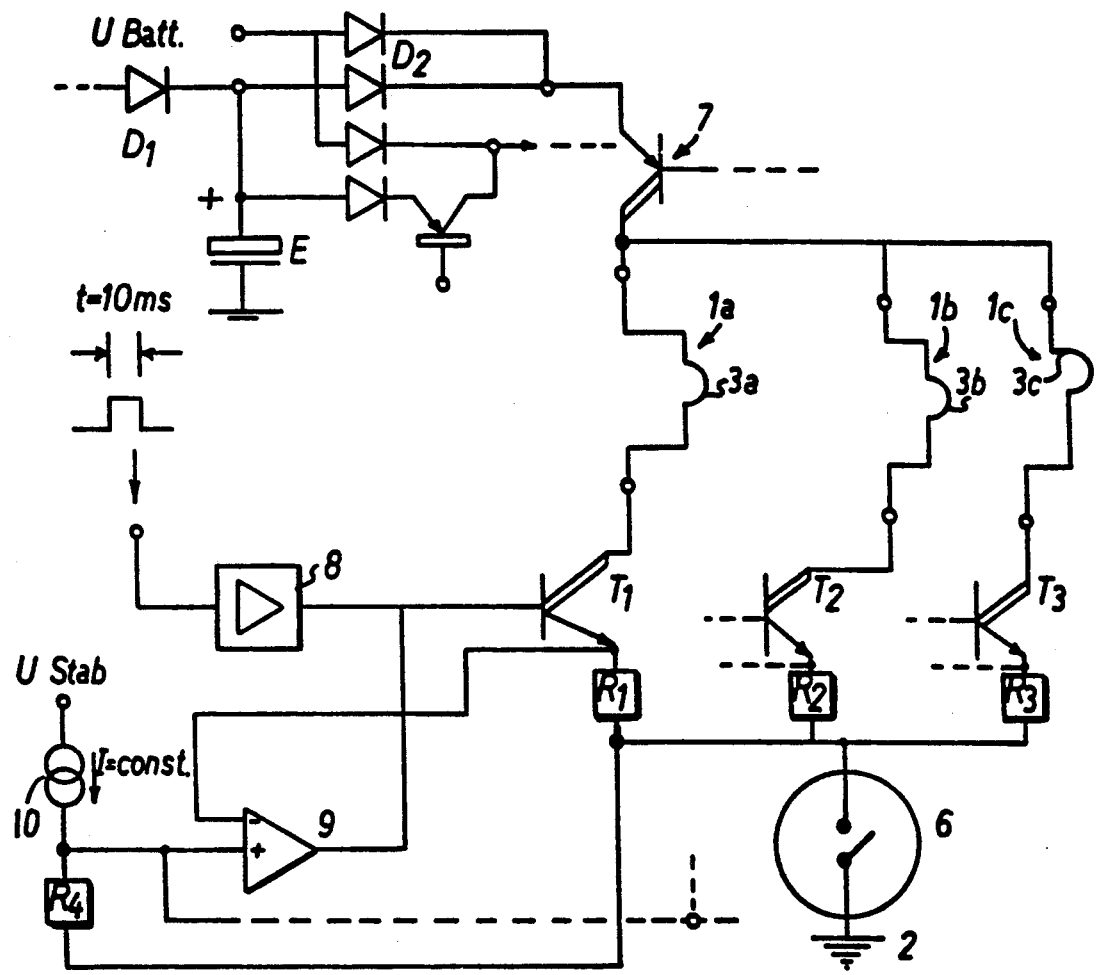

AIR BAG SYSTEM FOR PROTECTION OF THE OCCUPANTS OF MOTOR VEHICLES

STATE OF THE ART

The present invention relates to an air bag system for protection of the occupants of a motor vehicle, such as the kind described in document No. WO-A-88/01241.

With such systems, it is required that reliable activation of the air bags be ensured in the situation that there is a loss of battery power at a time when such activation is needed and also in the event of shunts or short circuits forming in the driver's and/or front-seat passengers' gas generators. The firing of rearseat passengers' igniters or squibs and the vehicle crash recorder (when fitted) must also be ensured.

It is an object of the present invention to develop a system in which reliability and safety are considerably enhanced, especially in case of loss of battery power.

The aforegoing object is achieved by adopting the features set forth in the appended claims. One advantage of the present invention is that there is only one single energy storage capacitor to be monitored and that there is sufficient energy provided to fire a plurality of igniters or squibs even after a loss of battery power.

DRAWING

The invention is described further, by way of example only, with reference to the accompanying drawing which is a circuit diagram of one embodiment of an air bag protection system in accordance with the invention for the occupants of motor vehicles.

DESCRIPTION OF THE EXEMPLARY EMBODIMENT

The drawing shows part of an air bag protection system wherein a number of firing circuits $1a$, $1b$, $1c$ are connected in parallel between a regulated battery voltage $U_{BATT}$ and the grounded side 2 of the vehicle battery. Each firing circuit includes a respective igniter $3a$, $3b$, $3c$ connected in series with a respective power transistor $T_1$, $T_2$, $T_3$ and a low ohmic resistor $R_1$, $R_2$, $R_3$. Connected in series with the three resistors $R_1$, $R_2$, $R_3$ is a mechanical switch 6 of known type, which is sensitive to vehicle deceleration and which only closes when a predetermined retardation is experienced (such as would be incurred, for example, in a collision). Thus, in this embodiment, the single mechanical switch is common to all three firing circuits. The three igniters $3a$, $3b$, $3c$ are connected via a monitoring switch 7 (also referred to as power stage 7) and diodes $D_1$ and $D_2$ to the regulated battery voltage $U_{BATT}$. The diodes $D_1$ and $D_2$ serve as protection against incorrect battery polarisation and the monitoring switch 7 enables the circuit to be selectively tested for correct operation.

Also connected to the battery voltage $U_{BATT}$, at a point downstream of the diode $D_1$ is a single energy storage capacitor E, preferably of the AL-ELCO type, having a large capacitance value, for example 10,000 uF. It will be noted that this single storage capacitor E is commonly connected via the high side monitoring transistor 7 to all three firing circuits $1a$, $1b$ and $1c$.

The occupant protection system is triggered when, in the event of an accident, a sensor (not shown) is activated and supplies a pulsed signal, for example of 10 ms duration, to turn on the power transistors $T_1$, $T_2$ and $T_3$ via driver stages 8 (only one shown) and additionally the high side power stage 7. Provided that the externally acting mechanical retardation on the vehicle has been sufficient to close the arming switch 6, current from the single energy storage capacitor E can then pass through the igniters so as to inflate the associated air bags (not shown).

In order to limit the current passing through the igniters to an acceptable level, the voltages on the resistors $R_1$, $R_2$, $R_3$ are applied to the negative inputs (−) of respective comparators 9 (only one shown) serving as firing current limiters. The positive inputs (+) of the comparators are provided with reference Voltages by passing a current through respective resistors $R_4$ from a constant current source 10 supplied with a stabilized voltage $U_{STAB}$. Upon the voltage at the negative input exceeding the reference voltage at the positive input of the comparator (corresponding to the current through the resistors $R_1$ $R_2$ $R_3$ having exceeded a predetermined value) the comparator outputs a signal to the bases of the transistors $T_1$, $T_2$, $T_3$ such as to cause the current passing through the collector-emitter paths of these transistors, and hence through the igniters $3a$, $3b$, $3c$ to be reduced to an acceptable level.

With limitation of the activation of the output stages in this manner both with respect to time and current, the required energy balance can be handled by the single capacitor E. By way of example, a 10,000 uF Al-Elco capacitor charged to 16–17 volts is sufficient in the case of two air bags. By using only one "large" capacitor instead of the usual several (usually 4) "small" capacitors one obtains, in principle, a capacitor (Al-Elco) with better characteristics (e.g. $R_{ESR}$, durability and reliability).

In one type of capacitor used in practice, the C.U product is (approximately) constant for a given size of casing. That is to say, the higher the capacitor of a specific size of casing is charged (the relatively lower is the undervoltage switch-off threshold of the unit), the greater is the amount of energy available.

$$\text{Energy} = C\,(U_1^2 - U_2^2)\,2$$

where
 U1 = charging voltage
 U2 = undervoltage threshold
 C = capacitance

By incorporating output stage current limitation, there is no risk of the firing transistor $T_1$, $T_2$, $T_3$ being overloaded by current, even when the energy reserve E is charged to a relatively high voltage (e.g. $U_1 = 40V$).

Likewise, the contacts of the mechanical switch 6 are not overloaded if the output stage current is limited as described above. Switches of this type are normally only rated at 10A for 10 ms. Current limitation to, say about 1.5A for each air bag output stage (and for each belt tightener, output stage, if present) will always keep the operation of the switch 6 within its permitted operational range (over the entire fluctuation of the battery voltage e.g. $7V \leq UBATT \leq 16V$).

The amount of additional hardware necessary to achieve this system, i.e. the expenditure on circuitry for limiting the firing current per output stage, is relatively small. Furthermore, the overall size and cost of the unit are not increased significantly when using only a single energy reserve capacitor E.

Although the number of igniters or squibs in the illustrated embodiment is three, there can be any desired number (e.g. a driver and passenger system with belt tighteners for front and rear passengers typically includes 7 igniters).

We claim:

1. A system for the protection of the occupants of a motor vehicle, particularly an air bag protection system, comprising:

a plurality of firing circuits coupled between a battery supply voltage and ground, each firing circuit including a bag igniter, each bag igniter being coupled in series with a respective triggerable power switch, at least one retardation sensitive mechanical arming switch coupled to said power switches, a single energy storage capacitor coupled to each of said firing circuits for supplying initiation energy to each circuit over an upper common power stage in the event of a loss of the battery supply voltage, a plurality of resistors, each resistor being coupled in series with a respective power switch, and a comparator for comparing the voltage across at least one of the resistors with a reference voltage and controlling the power switches based upon the comparison to limit the current flowing through the power switches, and hence through the bag igniters, from the energy storage capacitor.

2. A system according to claim 1, wherein the comparator limits the time duration for which the power switches are actuated.

3. A system according to claim 1, wherein the power switches are transistors.

4. A system for the protection of the occupants of a motor vehicle, particularly an air bag protection system, comprising:

a plurality of firing circuits coupled between a battery supply voltage and ground, each firing circuit including a bag igniter, each bag igniter being coupled in series with a respective triggerable power switch, at least one retardation sensitive mechanical arming switch coupled to said power switches, a single energy storage capacitor coupled to each of said firing circuits for supplying initiation energy to each circuit over an upper common power stage in the event of a loss of the battery supply voltage, and means for limiting the current flowing through the individual triggerable power switches, and hence through the bag igniters, from the energy storage capacitor, wherein the means for limiting limits the time duration for which the power switches are actuated by using pulsed trigger signals for actuating said power switches.

5. An apparatus for actuating at least one safety device for protecting the occupants in a motor vehicle during a collision, comprising:

at least one firing circuit coupled to the safety device and to a voltage supply, the firing circuit being adapted to actuate the safety device in response to the passage of current therethrough, the firing circuit including an ignition device coupled in series with a transistor, the transistor being adapted to permit the passage of current through the ignition device to actuate the safety device;

a capacitor coupled to the firing circuit and to the voltage supply, the capacitor being adapted to supply voltage to the firing circuit upon disconnection of the voltage supply to, in turn, actuate the safety device;

means for determining the amount of current passing through the firing circuit from the capacitor; and means for controlling the transistor as a function of the determined amount of current passing through the firing circuit from the capacitor to limit the current passing through the firing circuit from the capacitor to permit additional safety devices to be actuated by the capacitor.

6. An apparatus for actuating at least one safety device for protecting the occupants in a motor vehicle during a collision, comprising:

at least one firing circuit coupled to the safety device and to a voltage supply, the firing circuit being adapted to actuate the safety device in response to the passage of current therethrough, the firing circuit including an ignition device coupled in series with a transistor, the transistor being adapted to permit the passage of current through the ignition device to actuate the safety device;

a capacitor coupled to the firing circuit and to the voltage supply, the capacitor being adapted to supply voltage to the firing circuit upon disconnection of the voltage supply to, in turn, actuate the safety device;

a resistor coupled in series with the transistor; and a comparator coupled to the resistor, the transistor and a reference voltage, the comparator being adapted to compare the voltage across the resistor to the reference voltage, and if the resistor voltage exceeds the reference voltage, to transmit a signal to the transistor to limit the level of current passing through the firing circuit from the capacitor to permit additional safety devices to be actuated by the capacitor.

7. An apparatus as defined in claim 6, further comprising:

an arming switch coupled between the resistor and ground, the arming switch being responsive to the acceleration of the motor vehicle to close in response to the acceleration exceeding a threshold level and, thus, permit current to pass through the firing circuit.

8. An apparatus for actuating a plurality of safety devices for protecting the occupants of a motor vehicle during a collision, comprising:

a plurality of firing circuits, each firing circuit being coupled to a respective safety device and to a voltage supply, each firing circuit including an ignition device coupled in series with a power switch, each power switch being adapted to permit the passage of current through the ignition device to actuate the respective safety device;

an electric storage device coupled to each firing circuit and to the voltage supply, the storage device being adapted to supply voltage to the firing circuits upon disconnection of the voltage supply to, in turn, actuate the safety devices;

means for determining the amount of current passing through at least one of the firing circuits from the electric storage device; and a current limiting circuit coupled to each firing circuit and adapted to control at least one of the power switches as a function of the determined amount of current for limiting the current passing through the at least one of the firing circuits from the electric storage device to permit each firing circuit and, thus, safety device to be actuated by the electric storage device.

9. An apparatus for actuating a plurality of safety devices for protecting the occupants of a motor vehicle during a collision, comprising:
- a plurality of firing circuits, each firing circuit being coupled to a respective safety device and to a voltage supply, each firing circuit including an ignition device coupled in series with a power switch, each power switch being adapted to permit the passage of current through the ignition device to actuate the respective safety device;
- an electric storage device coupled to each firing circuit and to the voltage supply, the storage device being adapted to supply voltage to the firing circuits upon disconnection of the voltage supply to, in turn, actuate the safety devices; and
- a current limiting circuit coupled to each firing circuit and adapted to limit the current passing through the firing circuits from the electric storage device to permit each firing circuit and, thus, safety device to be actuated by the electric storage device, wherein the current limiting circuit includes a plurality of resistors, each resistor being coupled in series with a respective power switch; and a plurality of comparators, each comparator being coupled to a respective resistor and power switch, and to a reference voltage, each comparator being adapted to compare the voltage across the respective resistor to the reference voltage, and if the resistor voltage exceeds the reference voltage, to transmit a signal to the respective power switch to correspondingly reduce the level of current passing therethrough.

10. An apparatus as defined in claim 9, wherein the electric storage device is a capacitor.

* * * * *

UNITED STATES PATENT AND TRADEMARK OFFICE
CERTIFICATE OF CORRECTION

PATENT NO. : 5,204,547

DATED : April 20, 1993

INVENTOR(S) : Schumacher et al.

It is certified that error appears in the above-indentified patent and that said Letters Patent is hereby corrected as shown below:

Column 2     line 40, change "$C(U_1^2-U_2^2)2$" to $--\underline{C}(U_1^2-U_2^2)--$.
                   2

Signed and Sealed this

Thirty-first Day of May, 1994

Attest:

BRUCE LEHMAN

*Attesting Officer*      *Commissioner of Patents and Trademarks*